April 27, 1943.   K. MILLER   2,317,473
MASTER CYLINDER FOR HYDRAULIC BRAKING SYSTEMS
Original Filed Feb. 2, 1940

Inventor:
Kay Miller
By
McCanna, Wintercorn & Morsbach
Attys

Patented Apr. 27, 1943

2,317,473

UNITED STATES PATENT OFFICE 2,317,473

MASTER CYLINDER FOR HYDRAULIC BRAKING SYSTEMS

Kay Miller, Rockford, Ill., assignor to The Atwood Vacuum Machine Company, Rockford, Ill., a copartnership composed of Seth B. Atwood and James T. Atwood Original application February 2, 1940, Serial No. 316,896. Divided and this application October 2, 1941, Serial No. 413,335

14 Claims. (Cl. 60—54.6)

This application is a division of my copending application Serial No. 316,896, filed February 2, 1940.

This invention relates to hydraulic braking systems and has particular reference to an improved master piston and cylinder mechanism therefor.

The aim of certain improvements in hydraulic braking systems in recent years has been to provide for quick take-up of the slack in the system and obtain the desired braking force with lower brake pedal pressure, whereby to eliminate the use of boosters or any other power type braking means and secure greater safety in addition to easier and generally more satisfactory operation. However, so far as I am aware, this object has not been attained and such devices as have been proposed have not been practical, if operative at all, and they were moreover too complicated and expensive, and as a result have not been adopted commercially. It is, therefore, the principal object of my invention to provide a master cylinder having a compound type piston so constructed and so arranged with relation to the braking system and the brake fluid reservoir that the kind of operation desired is obtained in a highly practical and efficient manner and without complicating the construction or adding to the cost appreciably, if any.

The invention is illustrated in the accompanying drawing, in which—

Figure 1:
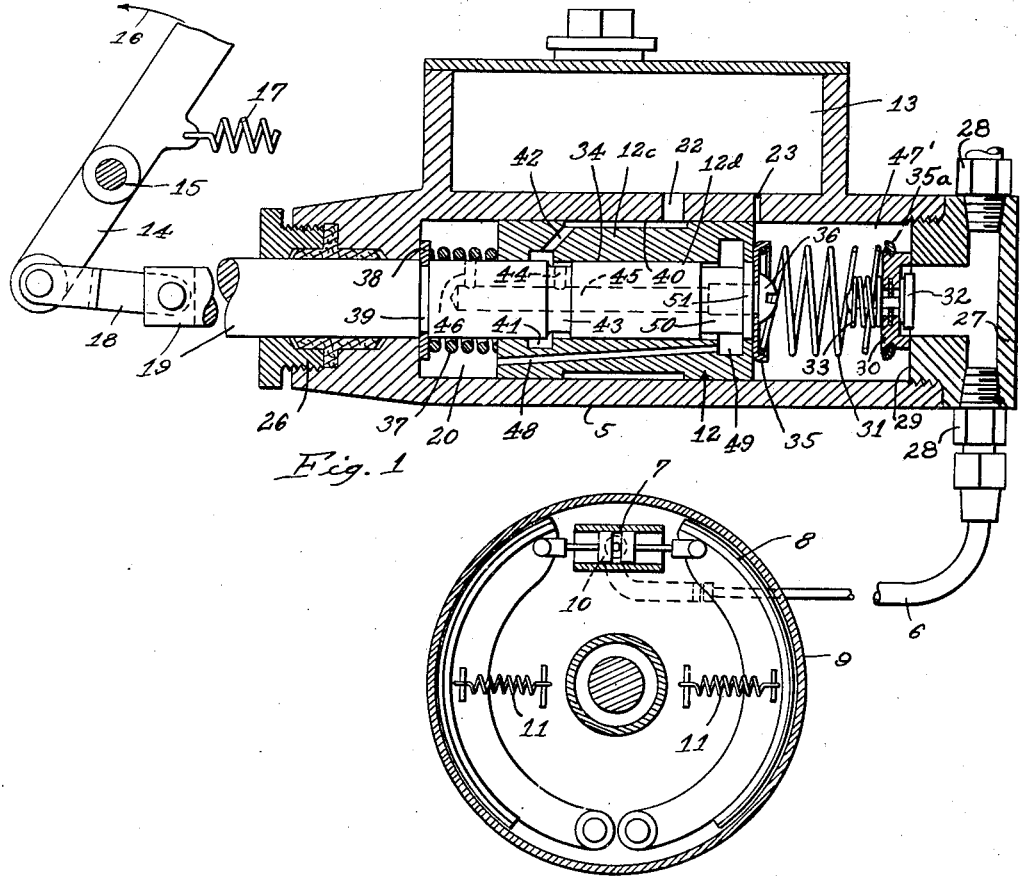
Figure 2:
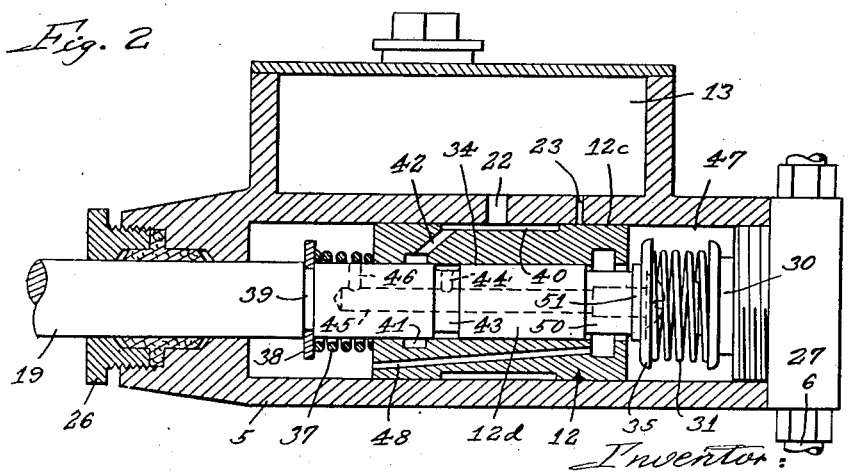

Figure 1 is a longitudinal section through the master cylinder and reservoir equipped with a compound piston constructed in accordance with my invention, the cylinder being illustrated as connected with a brake system and arranged to have its piston operated by a pedal operated lever, and Fig. 2 is a view of the main parts of Fig. 1 in moved positions.

The same reference numerals are applied to corresponding parts of these views.

Referring to the drawing, 5 is the master cylinder having conduits 6 extending from the discharge end thereof to the various brake cylinders 7 associated with the brake shoes 8 and the brake drums 9 of the wheels of the vehicle, the shoes 8 being operable under hydraulic fluid pressure from the conduits 6 by pistons 10 in the usual way, and arranged to be retracted by suitable spring means 11. This portion of the brake system is shown diagrammatically inasmuch as the present invention relates primarily to the master cylinder 5 and its compound piston 12, except, of course, in so far as these elements 5 and 12 cooperate with the rest of the brake system, like the braking fluid reservoir 13 and a pedal or otherwise manually operated lever 14 in new and patentable combinations. The lever 14 is shown as pivoted at 15 and arranged to be moved manually in a counter-clockwise direction, as indicated by the arrow 16, and to be returned by suitable spring means, indicated at 17. The lever 14 may on the other hand be operated by suitable power means where so desired although, as will soon appear, the compound piston 12 enables such easy manual operation that so-called boosters or other power means are actually not necessary. The lever 14 is shown as connected by means of a link 18 with the outer end of the piston rod 19 of the piston 12.

The cylinder 5 has a bore 21 of uniform diameter from end to end. The reservoir 13, which is shown as formed integral with the wall of the cylinder, but which, of course, may be a separate unit, has open communication with the bore 20 through a large port 22 and a small port 23. A stuffing box 26 provides a fluid-tight seal for the rear end of the bore 20 around the rod 19. A plug 27 is threaded in and closes the front end of the bore 20 and carries the nipples to which the conduits 28 for the various brake cylinders are connected. A seat 29 provided on the plug 27 has the usual large return valve 30 seating thereon under action of a coiled compression spring 31. The latter engages an annular seat 35a on the return valve, as clearly appears in the drawing, and functions to return the piston 12 to retracted position after application of the brakes. The valve 30 carries an outlet valve 32, which is held closed under light pressure by means of a spring 33.

The compound piston 12 shown comprises an outer large tubular piston 12c and an inner piston 12d having a close working fit in the axial bore 34 of the outer piston, the annular grooves 40 and 41 in the outer piston 12c are interconnected by one or more radial passages 42 and the groove 43 in the inner piston 12d communicates normally with the groove 41 in the outer piston, whereby to establish communication between the bore 20 in the cylinder 5 and the reservoir 13 in the following manner: From reservoir 13 through port 22 to groove 40, from groove 40 through passage 42 to groove 41, and from groove 41 through passages 44, 45, and 46 to the bore 20. The washer 35 provides a limiting abutment for the outer piston 12c against which the spring 37 holds the piston, the spring being backed up by the ring 38 entered in the groove 39. It will be noticed that the bore 20 is of uniform diameter from end to end, the ring 38 providing a sufficient shoulder to limit return movement of the compound piston 12. The outer piston 12c has one or more longitudinal passages 48 extending from the rear end thereof forwardly to an annular internal groove 49 communicating with an annular external groove 50 in the inner piston 12d. An annular shoulder 51 defining one side of the groove 50 normally seals the annular groove 49 by closing the front end of the axial bore 34 in the outer piston 12c, but when the inner piston 12d moves forwardly more or less independently of the outer piston 12c, as in Fig. 2, the end of the axial bore 34 is opened into communication with the compression cylinder 47 and the outer piston 12c is accordingly free to creep forward with but in lagging relation to the inner piston, the pressure in front and behind the outer piston being continuously balanced through passage 48. In other words, the outer piston is thereafter in floating relation to the inner piston and is therefore inoperative, the inner piston being the only one capable of causing further displacement of oil from the bore 20.

In operation, the small port 23 connects the compression cylinder 47 with the reservoir 13 when the compound piston 12 is in the retracted position shown in Fig. 1. Under these conditions the large port 22 is in open communication with the bore 20 as follows: It communicates with the front end of the annular external groove 40 in the outer piston 12c, and the external groove 43 in the inner piston 12d is in communication with the internal groove 41 in the outer piston 12c so that communication with the bore 20 is established through passages 44—46. However as soon as the compound piston 12 is moved forward, the compression cylinder 47 is cut off from communication with the reservoir 13 by the outer piston 12c covering the small port 23, and the piston 12 accordingly discharges oil, or whatever other braking fluid is used, from the compression cylinder 47 through the outlet valve 30 and thence through the conduits 6 into the brake cylinders 7, thus forcing the pistons 10 outwardly to apply the brake shoes 8 against the resistance of their springs 11. When the compound piston 12 has been moved enough to take up all or most of the slack in the braking mechanism of the car, there is sufficient back pressure in the compression cylinder 47 to overcome the spring 37 and any further movement of the piston rod 19 will, therefore, cause the inner piston 12d to move forwardly independently of the outer piston 12c in the manner shown in Fig. 2. When that occurs, the passage 48 serves to bypass oil so as to balance the pressure on opposite sides of the outer piston 12c, and the spring 37 thereupon becomes effective to move the outer piston 12c forward with the inner piston 12d. The outer piston, in other words, creeps forward with the inner piston just so long as the inner piston moves but remains in lagging relation thereto. The inner piston is, therefore, the only one capable of causing further displacement of oil from the bore 20. The pedal pressure with this construction is lighter than with certain other constructions heretofore devised, because the spring 37 does not work in opposition to the pedal during the application of high pressure to the brakes. When the brake pedal pressure previously applied to the rod 19 is released, the spring 17 returns the lever 14 and the spring 31 returns the compound piston 12 toward normal retracted position. In this operation the fluid pressure in the compression cylinder 47 is, of course, immediately relieved, so that there is nothing to interfere with the outer piston 12c moving forward relative to the inner piston 12d under action of the spring 37 to a point where it strikes the washer 35, and, as a result, the compound piston is free to return, because the oil returns to the reservoir 13 through the same ports and passages communicating with the port 22 through which it entered the bore 20, grooves 41 and 43 being in communication at this time. The functioning of the compound piston 12, it should be clear, is entirely automatic in so far as the point at which the inner piston 12d will commence to move forwardly independently of the outer piston 12c is concerned, because regardless of wear on the brake shoe linings, the compound piston will move forwardly as a whole until all or most of the slack in the mechanism has been taken up and a predetermined back pressure is developed in the conduits 6 and cylinder 47 sufficient to overbalance the spring 37, whereupon the inner piston 12d is free to move forwardly independently of the outer piston 12c.

It is believed the foregoing description conveys a good understanding of the objects and advantages of my invention. The appended claims have been drawn to cover all legitimate modifications and adaptations.

I claim:

1. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, a reservoir for operating fluid, means providing restricted communication between the reservoir and said first bore at a point in front of the main piston in its retracted position, other means providing communication between the reservoir and said first bore behind said main piston, said means including means for cutting off such communication upon movement of the secondary piston forwardly relative to the main piston, means for establishing communication through the main piston between the space in the bore in front of said piston and the space in the bore behind said piston, said means including means normally cutting off such communication but opening such communication upon forward movement of the secondary piston relative to the main piston, and spring means operatively connecting the main piston with the secondary piston to move forwardly together but permit forward movement of the secondary piston relative to the main piston, said spring means being yieldable to permit forward movement of the secondary piston relative to the main piston when the operating fluid offers a predetermined resistance to forward movement of said main piston, the said pistons constituting the sole means for displacing operating fluid from said first bore.

2. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, a coiled compression spring surrounding the secondary piston and compressible between it and the main piston for moving the main piston forwardly with the secondary piston, a reservoir for operating fluid, intercommunicating ports and passages in the pistons and cylinder normally establishing communication between the reservoir and the first bore behind the pistons, such communication being maintained only so long as the pistons are movable together as a unit, a washer on the end of the secondary piston for limiting forward movement of the main piston relative to the secondary piston under action of the compression spring, a passage in the main piston for establishing communication between the opposite ends of the first bore, said passage being arranged to be closed by the washer so as to be opened upon forward movement of the secondary piston relative to the main piston, and a coiled compression spring having engagement at one end on said washer and at its other end in the discharge end of said first bore to return said piston after forward movement thereof.

3. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, spring means operatively connecting the secondary piston with the main piston to move forwardly together, the said pistons constituting the sole means for displacing operating fluid from said first bore, a fluid reservoir, means forming a passage between the reservoir and the first bore behind the main piston partly through the main piston and partly through the secondary piston, said means including valve means for closing said passage upon forward movement of the secondary piston relative to the main piston, and means forming another passage between the space in the bore in front of the pistons and the space in the bore behind said pistons through said pistons, said means including valve means arranged to open said passage upon forward movement of the secondary piston relative to the main piston.

4. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, spring means operatively connecting the secondary piston with the main piston to move forwardly together, the said pistons constituting the sole means for displacing operating fluid from said bore, a fluid reservoir, means forming a passage between the reservoir and the first bore behind the main piston partly through the main piston and partly through the secondary piston, said means including valve means for closing said passage upon forward movement of the secondary piston relative to the main piston, and means forming another passage between the space in the bore in front of the pistons and the space in the bore behind said pistons through said pistons, said means including valve means arranged to open said passage upon forward movement of the secondary piston relative to the main piston, the valve means being formed by relatively movable portions on the main piston and secondary piston.

5. In a hydraulic brake system, a master cylinder having one or more conduits for connecting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, a coiled compression spring surrounding the secondary piston and compressible between it and the main piston for moving the main piston forwardly with the secondary piston, the said pistons constituting the sole means for displacing operating fluid from said first bore, a reservoir for operating fluid communicating with the discharge end of said first bore through a port in the wall of the cylinder closed by the main piston in its initial forward movement, means comprising intercommunicating ports and passages in the pistons and cylinder normally establishing communication between the reservoir and the first bore behind the pistons, such communication being maintained only so long as the pistons are movable together as a unit, said main piston having a passage provided therein to establish communication between the opposite ends of the first bore, and valve means closing said passage arranged to be opened only upon forward movement of the secondary piston relative to the main piston.

6. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, a coiled compression spring surrounding the secondary piston and compressible between it and the main piston for moving the main piston forwardly with the secondary piston, the said pistons constituting the sole means for displacing operating fluid from said first bore, a reservoir for operating fluid communicating with the discharge end of said first bore through a port in the wall of the cylinder closed by the main piston in its initial forward movement, means comprising intercommunicating ports and passages in the pistons and cylinder normally establishing communication between the reservoir and the first bore behind the pistons, such communication being maintained only so long as the pistons are movable together as a unit, said main piston having a passage provided therein to establish communication between the opposite ends of the first bore, and valve means closing said passage arranged to be opened only upon forward movement of the secondary piston relative to the main piston, said valve means being formed by relatively movable portions on the main piston and secondary piston.

7. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, a coiled compression spring surrounding the secondary piston and compressible between it and the main piston for moving the main piston forwardly with the secondary piston, the said pistons constituting the sole means for displacing operating fluid from said first bore, a reservoir for operating fluid communicating with the discharge end of said first bore through a port in the wall of the cylinder closed by the main piston in its initial forward movement, and means comprising ports and passages in the pistons and a communicating port in the wall of the cylinder opening into the reservoir providing open communication between the reservoir and the first bore behind said pistons so long as the pistons are movable together as a unit but arranged to simultaneously close off that communication and establish communication between the opposite ends of the first bore when the secondary piston moves forwardly relative to the main piston.

8. A device of the character described, comprising, in combination, a cylinder, a main piston having a close working fit in said cylinder, a secondary piston extending into one end of the cylinder and slidable in a longitudinal bore extending through the main piston, the other end of said cylinder having a discharge port, means positively limiting movement of the secondary piston relative to the main piston in a return direction, spring means resisting movement of the secondary piston relative to the main piston in the forward direction, said cylinder being substantially filled with hydraulic working fluid, a reservoir containing hydraulic working fluid, the reservoir having restricted communication with the cylinder in front of the main piston in the retracted position of the latter, said cylinder having a port intermediate the ends of the main piston communicating with said reservoir, passages provided in said main piston and secondary piston for flow of fluid between the last mentioned port and the space in said cylinder behind the main piston, valve means including relatively slidable portions on the main piston and secondary piston to shut off said fluid flow upon movement of the secondary piston forwardly relative to the main piston, a passage provided in the main piston for fluid flow between the opposite ends of said cylinder through said piston, and valve means including relatively slidable portions on the main piston and secondary piston for shutting off said flow except when the secondary piston has moved forwardly relative to the main piston.

9. A device of the character described, comprising, in combination, a cylinder, a main piston having a close working fit in said cylinder, a secondary piston extending into one end of the cylinder and slidable in a longitudinal bore extending through the main piston, the other end of said cylinder having a discharge port, means positively limiting movement of the secondary piston relative to the main piston in a return direction, spring means resisting movement of the secondary piston relative to the main piston in the forward direction, said cylinder being substantially filled with hydraulic working fluid, a reservoir containing hydraulic working fluid, said cylinder having a port intermediate the ends of the main piston communicating with said reservoir, passages provided in said main piston and secondary piston for flow of fluid between the last mentioned port and the space in said cylinder behind the main piston, valve means including relatively slidable portions on the main piston and secondary piston to shut off said fluid flow upon movement of the secondary piston forwardly relative to the main piston, a passage provided in the main piston for fluid flow between the opposite ends of said cylinder through said piston, and valve means including relatively slidable portions on the main piston and secondary piston for shutting off said flow except when the secondary piston has moved forwardly relative to the main piston.

10. A device of the character described, comprising, in combination, a cylinder, a main piston having a close working fit in said cylinder, a secondary piston extending into one end of the cylinder and slidable in a longitudinal bore extending through the main piston, the other end of said cylinder having a discharge port, a fluid return valve closing said port, a compression spring for holding said valve seated arranged to be compressed by forward movement of the secondary piston, a spring check valve in the return valve permitting discharge of fluid under pressure from the cylinder, means positively limiting movement of the secondary piston relative to the main piston in a return direction, spring means resisting movement of the secondary piston relative to the main piston in the forward direction, said cylinder being substantially filled with hydraulic working fluid, a reservoir containing hydraulic working fluid, the reservoir having restricted communication with the cylinder in front of the main piston in the retracted position of the latter, said cylinder having a port intermediate the ends of the main piston communicating with said reservoir, passages provided in said main piston and secondary piston for flow of fluid between the last mentioned port and the space in said cylinder behind the main piston, valve means including relatively slidable portions on the main piston and secondary piston to shut off said fluid flow upon movement of the secondary piston forwardly relative to the main piston, a passage provided in the main piston for fluid flow between the opposite ends of said cylinder through said piston, and valve means including relatively slidable portions on the main piston and secondary piston for shutting off said flow except when the secondary piston has moved forwardly relative to the main piston.

11. A device of the character described, comprising, in combination, a cylinder, a main piston having a close working fit in said cylinder, a secondary piston extending into one end of the cylinder and slidable in a longitudinal bore extending through the main piston, the other end of said cylinder having a discharge port, a fluid return valve closing said port, a compression spring for holding said valve seated arranged to be compressed by forward movement of the secondary piston, a spring check valve in the return valve permitting discharge of fluid under pressure from the cylinder, means positively limiting movement of the secondary piston relative to the main piston in a return direction, spring means resisting movement of the secondary piston relative to the main piston in the forward direction, said cylinder being substantially filled with hydraulic working fluid, a reservoir containing hydraulic working fluid, said cylinder having a port intermediate the ends of the main piston communicating with said reservoir, passages provided in said main piston and secondary piston for flow of fluid between the last mentioned port and the space in said cylinder behind the main piston, valve means including relatively slidable portions on the main piston and secondary piston to shut off said fluid flow upon movement of the secondary piston forwardly relative to the main piston, a passage provided in the main piston for fluid flow between the opposite ends of said cylinder through said piston, and valve means including relatively slidable portions on the main piston and secondary piston for shutting off said flow except when the secondary piston has moved forwardly relative to the main piston.

12. A compound piston mechanism of the character described for operation in a cylinder, comprising a reciprocable rod one end portion of which forms a secondary piston of small diameter for operation in the cylinder, a sleeve-like main piston of relatively large diameter having a close working fit internally on said secondary piston and a close working fit externally in said cylinder, a shoulder on the inner end of said rod limiting movement of the same relative to the main piston in one direction, a coiled compression spring surrounding the rod and acting between a shoulder on the rod and the adjacent end of the main piston to resist movement of the rod relative to said main piston in the opposite direction, the main piston having an internal annular groove and an external annular groove interconnected by a passage, said rod having an external annular groove and a longitudinal passage interconnected by a radial passage, the longitudinal passage communicating with one end of the cylinder through another radial passage provided in said rod, the annular groove in the rod registering with the annular groove in the main piston but being movable out of register therewith when the rod is moved relative to said main piston against the resistance of said compression spring, a longitudinal passage provided in the main piston to establish communication between the opposite ends of the cylinder, and a valve on said rod for shutting off such communication, said valve being opened when the rod is moved relative to the main piston against the resistance of said compression spring, the cylinder having a radial port provided therein communicating with the external annular groove in the main piston throughout the range of movement of said piston.

13. A compound piston mechanism of the character described for operation in a cylinder, comprising a reciprocable rod one end portion of which forms a secondary piston of small diameter for operation in the cylinder, a sleeve-like main piston of relatively large diameter having a close working fit internally on said secondary piston and a close working fit externally in said cylinder, a shoulder on the inner end of said rod limiting movement of the same relative to the main piston in one direction, a coiled compression spring surrounding the rod and acting between a shoulder on the rod and the adjacent end of the main piston to resist movement of the rod relative to said main piston in the opposite direction, the main piston having an internal annular groove and an external annular groove interconnected by a passage, said rod having an external annular groove and a longitudinal passage interconnected by a radial passage, the longitudinal passage communicating with one end of the cylinder through another radial passage provided in said rod, the annular groove in the rod registering with the annular groove in the main piston but being movable out of register therewith when the rod is moved relative to said main piston against the resistance of said compression spring, a longitudinal passage provided in the main piston to establish communication between the opposite ends of the cylinder, an internal annular groove in one end portion of the main piston remote from the first mentioned internal annular groove and communicating with one end of said passage, and an external annular groove in the end portion of the rod spaced from the end thereof in register with the last mentioned internal groove and arranged in the spring restrained movement of the rod relative to the main piston to establish communication between the adjacent end of the cylinder and the last named material annular groove.

14. In a hydraulic brake system, a master cylinder having one or more conduits for conducting operating fluid to and from the discharge end of a bore therein, a main piston having a working fit in said bore, manually operable brake operating means, a secondary piston directly operable by the latter of smaller diameter than the main piston and slidable in a second bore in said main piston so as to displace fluid from the discharge end of the first mentioned bore, a coiled compression spring surrounding the secondary piston and compressible between it and the main piston for moving the main piston forwardly with the secondary piston, the said pistons constituting the sole means for displacing operating fluid from said first bore, a reservoir for operating fluid communicating with the discharge end of said first bore through a port in the wall of the cylinder closed by the main piston in its initial forward movement, means comprising ports and passages in the pistons, and a communicating port in the wall of the cylinder opening into the reservoir providing open communication between the reservoir and the first bore behind said pistons so long as the pistons are movable together as a unit, but arranged to close off that communication when the secondary piston moves forwardly relative to the main piston, and other means comprising ports and passages in the pistons arranged to establish communication between the opposite ends of the first bore when the secondary piston moves forwardly relative to the main piston.

KAY MILLER.